(12) United States Patent
Downey

(10) Patent No.: US 7,877,320 B1
(45) Date of Patent: Jan. 25, 2011

(54) SYSTEM AND METHOD FOR TRACKING AND FACILITATING ANALYSIS OF VARIANCE AND RECOURSE TRANSACTIONS

(75) Inventor: Christopher T. Downey, Urbandale, IA (US)

(73) Assignee: Fannie Mae, Washington, DC (US)

( * ) Notice: Subject to any disclaimer, the term of this patent is extended or adjusted under 35 U.S.C. 154(b) by 0 days.

(21) Appl. No.: 12/831,905

(22) Filed: Jul. 7, 2010

Related U.S. Application Data

(62) Division of application No. 11/015,341, filed on Dec. 16, 2004, now Pat. No. 7,756,778.

(60) Provisional application No. 60/530,570, filed on Dec. 18, 2003.

(51) Int. Cl.
G06Q 40/00 (2006.01)

(52) U.S. Cl. .............................. 705/37; 705/35; 705/38; 705/1

(58) Field of Classification Search .................. 705/1, 705/37, 38, 39, 44, 7, 28; 707/102, 104; 235/380
See application file for complete search history.

(56) References Cited

U.S. PATENT DOCUMENTS

| | | | |
|---|---|---|---|
| 3,316,395 A | 4/1967 | Lavin | |
| 4,876,648 A | 10/1989 | Lloyd | |
| 5,239,462 A | 8/1993 | Jones et al. | |
| 5,262,941 A | 11/1993 | Saladin et al. | |
| 5,323,315 A | 6/1994 | Highbloom | |
| 5,361,201 A | 11/1994 | Jost et al. | |
| 5,414,621 A | 5/1995 | Hough | |
| 5,611,052 A | 3/1997 | Dykstra et al. | |
| 5,615,268 A | 3/1997 | Bisbee et al. | |
| 5,689,649 A | 11/1997 | Altman et al. | |
| 5,696,907 A | 12/1997 | Tom | |
| 5,699,527 A | 12/1997 | Davidson | |
| 5,732,400 A | 3/1998 | Mandler et al. | |
| 5,765,144 A | 6/1998 | Larche et al. | |
| 5,797,133 A | 8/1998 | Jones et al. | |
| 5,870,721 A | 2/1999 | Norris | |
| 5,878,403 A | 3/1999 | DeFrancesco et al. | |

(Continued)

FOREIGN PATENT DOCUMENTS

JP 2002-007701 1/2002

(Continued)

OTHER PUBLICATIONS

U.S. Appl. No. 10/330,346, filed Dec. 30, 2002, Kemper et al.

(Continued)

*Primary Examiner*—Mary Cheung
*Assistant Examiner*—John H Holly
(74) *Attorney, Agent, or Firm*—Foley & Lardner LLP

(57) ABSTRACT

A system for facilitating the analysis of a transaction request. The system includes an interface. The interface is configured to receive input data related to the transaction request. The input data includes at least a selection of a variance transaction or a recourse transaction. The system further includes a transaction request processor configured to generate a transaction assessment based on at least the input data and a reporting engine configured to provide the transaction assessment.

20 Claims, 7 Drawing Sheets

U.S. PATENT DOCUMENTS

| | | |
|---|---|---|
| 5,878,404 A | 3/1999 | Stout et al. |
| 5,930,775 A | 7/1999 | McCauley et al. |
| 5,930,776 A | 7/1999 | Dykstra et al. |
| 5,940,811 A | 8/1999 | Norris |
| 5,940,812 A | 8/1999 | Tengel et al. |
| 5,966,699 A | 10/1999 | Zandi |
| 5,983,206 A | 11/1999 | Oppenheimer |
| 5,995,947 A | 11/1999 | Fraser et al. |
| 6,029,149 A | 2/2000 | Dykstra et al. |
| 6,044,362 A | 3/2000 | Neely |
| 6,076,070 A | 6/2000 | Stack |
| 6,088,686 A * | 7/2000 | Walker et al. ............. 705/38 |
| 6,105,007 A | 8/2000 | Norris |
| 6,112,190 A | 8/2000 | Fletcher et al. |
| 6,233,566 B1 | 5/2001 | Levine et al. |
| 6,311,169 B2 | 10/2001 | Duhon |
| 6,385,594 B1 | 5/2002 | Lebda et al. |
| 6,405,181 B2 | 6/2002 | Lent et al. |
| 6,438,526 B1 | 8/2002 | Dykes et al. |
| 6,505,176 B2 | 1/2003 | DeFrancesco et al. |
| 6,513,018 B1 | 1/2003 | Culhane |
| 6,584,467 B1 | 6/2003 | Haught et al. |
| 6,594,635 B1 | 7/2003 | Erlanger |
| 6,609,109 B1 | 8/2003 | Bradley et al. |
| 6,611,816 B2 | 8/2003 | Lebda et al. |
| 6,823,319 B1 | 11/2004 | Lynch et al. |
| 6,898,574 B1 | 5/2005 | Regan |
| 6,988,082 B1 | 1/2006 | Williams et al. |
| 7,089,503 B1 | 8/2006 | Bloomquist et al. |
| 7,146,337 B1 | 12/2006 | Ward et al. |
| 7,155,409 B1 | 12/2006 | Stroh |
| 7,756,778 B1 | 7/2010 | Downey |
| 2001/0029482 A1 | 10/2001 | Tealdi et al. |
| 2001/0032178 A1 | 10/2001 | Adams et al. |
| 2001/0037287 A1 | 11/2001 | Broadbent et al. |
| 2002/0029194 A1 | 3/2002 | Lewis et al. |
| 2002/0035520 A1 | 3/2002 | Weiss |
| 2002/0040339 A1 | 4/2002 | Dhar et al. |
| 2002/0052815 A1 | 5/2002 | Johnson et al. |
| 2002/0052835 A1 | 5/2002 | Toscano |
| 2002/0059137 A1 | 5/2002 | Freeman et al. |
| 2002/0087389 A1 | 7/2002 | Sklarz et al. |
| 2002/0091630 A1 | 7/2002 | Inoue |
| 2002/0099650 A1 | 7/2002 | Cole |
| 2002/0111901 A1 | 8/2002 | Whitney |
| 2002/0138414 A1 | 9/2002 | Baker |
| 2002/0152155 A1 | 10/2002 | Greenwood et al. |
| 2002/0188535 A1 | 12/2002 | Chao et al. |
| 2003/0018558 A1 | 1/2003 | Heffner et al. |
| 2003/0028478 A1 | 2/2003 | Kinney et al. |
| 2003/0033241 A1 | 2/2003 | Harari |
| 2003/0033242 A1 | 2/2003 | Lynch et al. |
| 2003/0036994 A1 | 2/2003 | Witzig et al. |
| 2003/0036995 A1 | 2/2003 | Lazerson |
| 2003/0036996 A1 | 2/2003 | Lazerson |
| 2003/0065614 A1 | 4/2003 | Sweeney |
| 2003/0093366 A1 * | 5/2003 | Halper et al. ............. 705/38 |
| 2003/0139990 A1 | 7/2003 | Greco |
| 2003/0144949 A1 | 7/2003 | Blanch |
| 2003/0144950 A1 | 7/2003 | O'Brien et al. |
| 2003/0172025 A1 | 9/2003 | Gallina |
| 2003/0182225 A1 | 9/2003 | Maestle |
| 2003/0187696 A1 | 10/2003 | Bonissone et al. |
| 2003/0187697 A1 | 10/2003 | Bonissone et al. |
| 2003/0187698 A1 | 10/2003 | Bonissone et al. |
| 2003/0187699 A1 | 10/2003 | Bonissone et al. |
| 2003/0187700 A1 | 10/2003 | Bonissone et al. |
| 2003/0187701 A1 | 10/2003 | Bonissone et al. |
| 2003/0187702 A1 | 10/2003 | Bonissone et al. |
| 2003/0208385 A1 | 11/2003 | Zander et al. |
| 2003/0212654 A1 | 11/2003 | Harper et al. |
| 2003/0217034 A1 | 11/2003 | Shutt |
| 2003/0220863 A1 | 11/2003 | Holm et al. |
| 2003/0220879 A1 | 11/2003 | Gaughan et al. |
| 2003/0229553 A1 | 12/2003 | Kongyingyong et al. |
| 2003/0229581 A1 | 12/2003 | Green et al. |
| 2003/0233260 A1 | 12/2003 | Snell et al. |
| 2003/0233316 A1 | 12/2003 | Hu et al. |
| 2004/0002915 A1 | 1/2004 | McDonald et al. |
| 2004/0019517 A1 | 1/2004 | Sennott |
| 2004/0030616 A1 | 2/2004 | Florance et al. |
| 2004/0030649 A1 | 2/2004 | Nelson et al. |
| 2004/0034592 A1 | 2/2004 | Hu et al. |
| 2004/0049445 A1 | 3/2004 | Kishore |
| 2004/0059653 A1 | 3/2004 | Verkuylen et al. |
| 2004/0064402 A1 | 4/2004 | Dreyer et al. |
| 2004/0107161 A1 | 6/2004 | Tanaka et al. |
| 2004/0122717 A1 | 6/2004 | Hancock |
| 2005/0080722 A1 | 4/2005 | Kemper et al. |
| 2005/0102229 A1 | 5/2005 | Kemper et al. |
| 2006/0074793 A1 | 4/2006 | Hibbert et al. |
| 2006/0074794 A1 | 4/2006 | Nespola, Jr. |

FOREIGN PATENT DOCUMENTS

| | | |
|---|---|---|
| JP | 2002-259696 | 9/2002 |
| JP | 2002-288426 | 10/2002 |
| JP | 2003-223559 | 8/2003 |
| WO | WO 99/48036 | 9/1999 |
| WO | WO 00/21011 | 4/2000 |
| WO | WO 00/75833 | 12/2000 |
| WO | WO 01/27832 | 4/2001 |
| WO | WO 01/41019 | 6/2001 |
| WO | WO 01/50318 | 7/2001 |
| WO | WO 01/80123 | 10/2001 |
| WO | WO 01/98999 | 12/2001 |
| WO | WO 02/08855 | 1/2002 |
| WO | WO 02/23443 | 3/2002 |

OTHER PUBLICATIONS

Asset—Backed Alert, Firm Touts CBO Model for ABS Pools, Nov. 27, 2000, p. 2, Trade Journal—AMAL—Banking and Insurance, R KS Consulting.

Breakthroughs in Mortgage Banking: Looking Toward the Future, Real Estate Finance Press, Mortgage Bankers Association of America, 1996, pp. 5-1-5-8, ISBN 1 57599 016-4, Jess Lederman, Editor.

Business Wire, Visible Markets Launches World's First Internet Based Auction Marketplace for Mortgage Backed and Asset Backed Securities, Jun. 26, 2000, 2 pages.

EDOCS, "edocs Teams with Fannie Mae to Offer Lenders Online Account Management Solution," Press Release, Mar. 12, 2001, edocs, Inc., USA, 2 pages.

Fannie Mae "Fannie Mae Announces MORNETPlus Connections; Now Provides Lenders with Access to the Largest Network of Service Providers on the Web for Appraisals Flood Certificates Title Insurance and Closing and Escrow Services" Press Release Apr. 18, 2001, 3 pgs. Fannie Mae USA.

Fannie Mae "Selling Guide" 1995 2002, Part 1, 500 pages, Fannie Mae USA.

Fannie Mae "Selling Guide" 1995 2002, Part 2, 619 pages, Fannie Mae USA.

Fannie Mae "Servicing Guide" 1995 2002, 918 pages, Fannie Mae USA.

Fannie Mae "Servicing Guide" 1995 2002, Part 2, 418 pages, Fannie Mae USA.

Fannie Mae "Servicing Guide" 1995 2005, Part 1, 400 pages, Fannie Mae USA.

Fannie Mae "Servicing Guide" 1995 2005, Part 2, 523 pages, Fannie Mae USA.

Fannie Mae, "Fannie Mae and First American Financial to Provide Lenders with Electronic Access to More Products on MORNETPlus Network; Appraisals, Flood Certificates, and Title Insurance in Offering," Press Release, Dec. 21, 1999, Fannie Mae, Washington, DC, USA, 2 pages.

Fannie Mae, "Fannie Mae Unveils MORNETPlus on the Web; Lenders Can Now Access Automated Underwriting and Other Mortgage Transaction Services on Fanniemae.com," Press Release, Mar. 23, 2000, Fannie Mae, Washington, DC, USA, 2 pages.

Fannie Mae, "Making Good Delivery A Guide to Delivering Loans for Cash and MBS", 1994, Fannie Mae, Washington, DC, USA, 121 pages.

Fannie Mae, "MORNET MBS Pool Submission System User 19s Guide", Sep. 1998, Version 5.3, Fannie Mae, Washington, DC, USA, 259 pages.

Fannie Mae, "MORNET Servicing Support System User's Guide", Dec. 1998, Fannie Mae, Washington, DC, USA, 370 pages.

Fannie Mae, "Delivering Loans for Cash", 1997, 84 pages, Fannie Mae, Washington, DC, USA.

Fannie Mae, "Delivering Loans for MBS", 1996, 138 pages, Fannie Mae, Washington, DC, USA.

Fannie Mae, "General Servicing Fundamentals", 1996, 174 pages, Fannie Mae, USA.

Fannie Mae, "Guide to Underwriting with Desktop Underwriter", Oct. 1997, 134 pages, Version 4.0, Fannie Mae, Washington, DC, USA.

Fannie Mae, "Guide to Underwriting with Desktop Underwriter®," Sep. 2002, 212 pgs.

Fannie Mae, "Investor Accounting: Cash", 1996, 132 pages, Fannie Mae, Washington, DC, USA.

Fannie Mae, "MORNET Cash Delivery System User's Guide", Nov. 1997, 173 pages, Version 2.6, Fannie Mae, Washington, DC, USA.

Fannie Mae, "MORNET Manager User's Guide", Nov. 1998, 183 pages, Version 3.0, Fannie Mae, Washington, DC, USA.

Fannie Mae, "Secondary Marketing: Cash", 1997, 81 pages, Fannie Mae, USA.

Fannie Mae, "Selling", Jun. 30, 2002, 168 pgs, Fannie Mae, USA.

Final Office Action for U.S. Appl. No. 10/738,838 Mailed Apr. 25, 2006, 10 pgs.

Final Office Action for U.S. Appl. No. 10/738,838, dated Jul. 17, 2007, 11 pgs.

First Office Action for U.S. Appl. No. 10/738,838, dated Jun. 2, 2005, 8 pgs.

Laser Overview, May 1993, chapters 1 18.

Notice of Allowance for U.S. Appl. No. 11/015,341, dated Mar. 9, 2010, 4 pages.

Notice of Allowance for U.S. Application No. 11/015,341, dated Oct. 30, 2009, 8 pp.

Notice of Allowance for U.S. Appl. No. 10/738,838, dated Mar. 24, 2008, 3 pgs.

Notice of Allowance for U.S. Appl. No. 10/738,838, dated Jul. 31, 2008, 7 pgs.

Object Management Group, "Fannie Mae", CORBA Banking/Finance, Sep. 17, 2001, Object Management Group, Needham, MA, USA, 2 pages.

Office Action for U.S. Appl. No. 11/015,341, dated Apr. 21, 2009, 13 pages.

Office Action for U.S. Appl. No. 11/015,341, dated Jun. 19, 2008, 19 pages.

Office Action for U.S. Appl. No. 11/015,341, dated Sep. 26, 2007, 17 pages.

Office Action for U.S. Appl. No. 10/738,838, dated Jan. 17, 2007, 8 pgs.

Raines Franklin D., "Speech by Franklin D. Raines Chairman and CEO of Fannie Mae, Fannie Mae and the Mortgage Industry in the E Commerce Age," May 8, 2000, 20 pgs., Fannie Mae, USA.

Raines Franklin D., "Statement by Franklin D. Raines Chairman and CEO of Fannie Mae, Speech at 2003 Fannie Mae eBusiness Forum," Sep. 17, 2003, 6 pgs, Fannie Mae, USA.

Smith Tom "Fannie Mae Ramps up Web Apps: Q&A with Julie St. John Executive Vice President and Chief Technology Office and Michael Williams President of Fannie Mae e Business" Internetweek.com Undated 11 pgs. Internetweek.com USA.

Smith Tom, "E Commerce Holds Keys to Home Ownership: Fannie Mae drives hug volumes of mortgage business to its e marketplace," Internetweek.com, Undated, 5 pgs., Internetweek.com, USA.

Sun, "Success on Sun: Software Development Case Study Federal National Mortgage Association (Fannie Mae)," Mar. 1995, 10 pages, Sun, USA.

Williams Michael, "Technology and Other Keys to the Boom in Refinancing," American Banker, Apr. 20, 2003, vol. 168, Issue 63, p. 8. (3 pages total), American Banker USA.

* cited by examiner

Request Details

| 221 — Request Tracker ID* | [    ] | Status | [    ] | 225 |
| Date/Time | [    ] | Sub Status | [    ] |
| 222 — Requester | [    ] | Seller Service ID/Lender* | [    ] |
| 223 — Location | [    ] | Variance Description* | Product Type ▼ |
| Contact Person* | [    ] | Variance Detail* | Select Details ▼ |
| Request Type | Flow Only ▼ | Delivery Limit | [    ] % ▼ |
| Request Description* | [    ] | Deal ID | [    ] |
| Selected Skeleton* | National Skeletons / Bridge Loans / Bulk ALT A Product / Cash on Hand / Community Homes | Effective Date | [    ] | 224 |
|  |  | Expiry Date | [    ] |
|  |  | Files Attached | file1 / file2 |

Expecting Answer Date

CAT Team* [    ]      Lender* [    ]      226

Urgency Level*   ○ Low   ○ Medium   ○ High   ○ Super High      Additional Comments [    ]

Admin

Assign To [    ]
Date [    ]      Internal Comments [    ]      227

DC Team Response* [    ]      External Comments (For Report) [    ]

[Submit] [Save as Draft] [Reset] [Attach Files]
228

FIG. 2B

Request Details

| | | | |
|---|---|---|---|
| Transaction ID* | [        ] | Seller Service ID/Lender* | [        ] |
| Requester Name* | [        ] | Location | [        ] |
| Transaction Type* | [Select Approval Typ ▼] | Contact Person* | [        ] |

Deal / Transaction Information

| | | | |
|---|---|---|---|
| Request Type | [Select ▼] | Amout UPB* | [        ] |
| Credit Enhancement Type | [Select ▼] | Average FICO | [        ] |
| Product Type | [Select ▼] | Average LTV | [        ] |
| Stop Loss Type | [Select ▼] | Other Transaction Detail | [        ] |
| Stop Loss Amount | [        ] | | |
| Stress Loss Exposure | [     ] %UPB ▼ | | |

Admin

| | | | |
|---|---|---|---|
| Approved By | [        ] | SFCT Notes | [        ] |
| SFCTg Action* | [Approved ▼] | | |

[Submit] [Reset] [Save as Draft]

Select Criteria — 240

Location Name [Atlanta ▼] — 242  ○ Variance Request  ● Recourse Request — 244  Status [ ] — 246
From Date [ ]  To Date [ ]

[Search]

Click on Transaction ID to edit    Number of Transactions : 2** — 248

| Transaction ID | Requester Name | Contact Person | Date | Status | Location |
|---|---|---|---|---|---|
| ⊟ CT200301 | Test User | Test User | 06/18/2003 | Submitted | Chicago |
| Transaction ID | Requester Name | Contact Person | Date | Status | Location |
| CT200301 | Test User | Test User | 06/18/2003 | Submitted | Chicago |
| CT200301 | Test User | Test User | 06/18/2003 | Submitted | Chicago |
| CT200301 | Test User | Test User | 06/18/2003 | Submitted | Chicago |
| CT200301 | Test User | Test User | 06/18/2003 | Submitted | Chicago |
| ⊟ CT200301 | Dummy User | | 06/20/2003 | Approved | Atlanta |
| Transaction ID | Requester Name | Contact Person | Date | Status | Location |
| CT200301 | Test User | Test User | 06/18/2003 | Submitted | Chicago |
| CT200301 | Test User | Test User | 06/18/2003 | Submitted | Chicago |
| CT200301 | Test User | Test User | 06/18/2003 | Submitted | Chicago |
| CT200301 | Test User | Test User | 06/18/2003 | Submitted | Chicago |

FIG. 2D

SYSTEM AND METHOD FOR TRACKING AND FACILITATING ANALYSIS OF VARIANCE AND RECOURSE TRANSACTIONS

CROSS-REFERENCE TO RELATED PATENT APPLICATIONS

This application is a divisional of U.S. application Ser. No. 11/015,341, filed Dec. 16, 2004, titled "System and Method for Tracking and Facilitating Analysis of Variance and Recourse Transactions, which claims the benefit of U.S. Provisional Application No. 60/530,570, filed Dec. 18, 2003, both of which are hereby incorporated in their entirety.

FIELD OF THE INVENTION

The present invention relates generally to the field of systems and methods for providing financial services. More specifically, the present invention relates to a system and method for tracking and facilitating analysis of variance and recourse transactions.

BACKGROUND OF THE INVENTION

The purchase of a home is typically the largest investment that a person makes. Because of the amount of money required to purchase a home, most home buyers do not have sufficient assets to purchase a home outright on a cash basis. In addition, buyers who have already purchased a home may wish to refinance their home. Therefore, potential homebuyers consult lenders such as banks, credit unions, mortgage companies, savings and loan institutions, state and local housing finance agencies, and so on, to obtain the finds necessary to purchase or refinance their homes. These lenders offer mortgage products to potential home buyers. The lenders who make (originate and fund) mortgage loans directly to home buyers comprise the "primary mortgage market."

When a mortgage is made in the primary mortgage market, the lender can: (i) hold the loan as an investment in its portfolio, or (ii) sell the loan to investors in the "secondary mortgage market" (e.g., pension funds, insurance companies, securities dealers, financial institutions and various other investors) to replenish its supply of funds. The loan may be sold alone, or in packages of other similar loans, for cash or in exchange for mortgage backed securities which provide lenders with a liquid asset to hold or sell to the secondary market. By choosing to sell its mortgage loans to the secondary mortgage market for cash, or by selling the mortgage backed securities, lenders get a new supply of funds to make more home mortgage loans, thereby assuring home buyers a continual supply of mortgage credit.

Often, a seller and a purchaser enter into an agreement or agreements that define the types of loans the seller may sell to the purchaser. An agreement may include terms that permit a seller to provide loans according to terms that differ from the standard/default terms by which the purchaser typically purchases loans, referred to as a variance transaction. Such variance transactions may have an impact on the delivery and/or pricing of a loan. For example, an agreed upon variance may otherwise cause an error when a loan, including the variance, is delivered to the purchaser since it varies from what the purchase was expecting would be delivered.

Further, a seller and purchaser may enter into an agreement where a seller seeks to negotiate a higher selling price for a loan by offering assets of the seller as a recourse. A recourse is the right to demand payment from the endorser of a commercial paper when the first party liable fails to pay. Accordingly, in the event of a default of a loan, the purchaser has a recourse to collect against the assets of the seller. Such an agreement may be referred to as a recourse transaction.

Entering into a variance or recourse transaction can increase the risk to the purchaser. Examples of risk can include a borrower with a lower credit score, a larger loan than previously discussed, a seller having a low credit rating or highly leveraged assets, etc. Accordingly, a purchaser may require an approval process to analyze the transaction prior to entering the variance or recourse transaction.

During the approval process, the purchaser may analyze the transaction and/or the seller to determine whether to accept the additional risk. Traditionally, the analysis and approval process involves numerous communications between parties both within the purchaser and with the seller. Based on the numerous communications, the processing of the loan may be unduly delayed, thereby delaying funding of the loan by the purchaser. Further, the consistency in approving variances and recourses is highly variable because of the number of parties involved.

Accordingly, there exists a need for a system and method for facilitating the approval of a variance or recourse transaction. Further, there exists such a need wherein the system and method is configured to facilitate consistency in the approval of variance and recourse transactions. Yet further, there is such a need where the system or method is performed as a step in a system or method for generating a recourse or variance agreement.

SUMMARY OF THE INVENTION

One embodiment of the invention relates to a system for facilitating the analysis of a transaction request. The system includes an interface. The interface is configured to receive input data related to the transaction request. The input data includes at least a selection of a variance transaction or a recourse transaction. The system further includes a transaction request processor configured to generate a transaction assessment based on at least the input data and a reporting engine configured to provide the transaction assessment.

Another embodiment of the invention relates to a method for facilitating analysis of a transaction request. The method includes receiving input data related to a transaction request including a selection of a recourse transaction or a variance transaction, generating a transaction assessment based at least in part on the input data, and providing the transaction assessment.

Yet another embodiment of the invention relates to a system for facilitating the analysis of a variance transaction request. The system includes an interface configured to receive input data related to the variance transaction request including at least a request for a variance, a variance transaction requestor, and a variance transaction grantor, a transaction request database configured to store a record of variance transactions previously granted by the variance transaction grantor, a rules processor configured to provide a variance transaction assessment based on at least the record of variance transactions previously granted by the variance transaction grantor, and a reporting engine configured to provide the variance transaction assessment.

BRIEF DESCRIPTION OF THE DRAWINGS

FIG. 2B is an illustration of a variance transaction request web page, according to an exemplary embodiment;

FIG. 2C is an illustration of a recourse transaction request web page, according to an exemplary embodiment;

FIG. 2D is an illustration of a reporting web page configured to facilitate tracking and analysis of transaction requests, according to an exemplary embodiment;

DETAILED DESCRIPTION OF THE PREFERRED EMBODIMENTS

Figure 1:
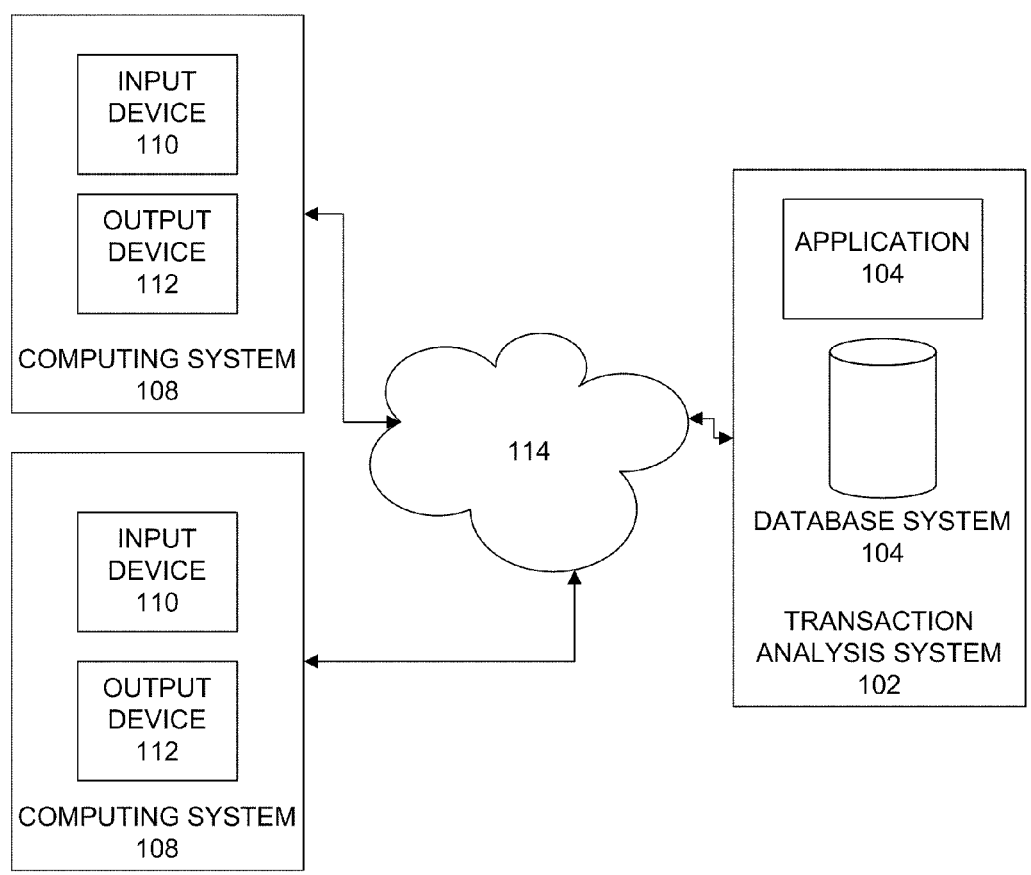
FIG. 1 is a diagram illustrating a transaction analysis system configured to facilitate analysis of variance or recourse transactions, according to an exemplary embodiment.

Referring now to FIG. 1, FIG. 1 is a diagram illustrating a transaction analysis system 102 configured to facilitate analysis of variance or recourse transactions according to an exemplary embodiment. System 102 is shown in a network environment 100. Network environment 100 includes transaction analysis system 102, at least one client computing system 108 and a network 114 enabling communication between system 102 and computing systems 108 on network 114.

In general, a seller of a loan, hereinafter referred to as the transaction request originator, may seek to have the variance or recourse transaction approved by the buyer of the loan. The variance or recourse transaction between a buyer and a seller is a transaction involving risk to the buyer. Accordingly, because of the additional risk, the buyer may require approval of the transaction prior to acceptance. System 102 is configured to facilitate analysis of the transaction by providing the transaction request to a transaction reviewer along with any related information such as historical data, a risk analysis, current market rates, etc. The transaction reviewer may be a human operator or a system that will analyze the transaction for approval or rejection.

According to an exemplary embodiment, in operation, system 102 is configured to enable a user of a computing system 108 to log in to system 102 through network 114. The user provides a transaction request including input data to be used in the analysis of the variance or recourse transaction request, as will be further discussed below with reference to FIG. 2. Upon receiving valid input data, system 102 is configured to facilitate analysis of the variance or recourse transaction, record the dispensation of the variance or recourse transaction for tracking and/or analysis, and provide output data. Output data may include an approval/rejection recommendation, a reporting message containing information and analysis to facilitate approval/rejection by a reviewer, an approval or disapproval of the variance or recourse transaction, etc., as will be further discussed below with reference to FIG. 3. System 102 may also be configured as a component in a larger system configured to facilitate management of financial transactions, discussed below with reference to FIG. 4

System 102 is a computing system configured to manage and facilitate the analysis and tracking of variance or recourse transactions. In operation, computer systems 108 submit the variance or recourse transactions to system 102 as transaction requests to be approved or rejected. Although the transaction requests are described herein as variance or recourse transaction requests, the transaction requests may alternatively be any other type of financial transaction request requiring approval as described herein.

System 102 is any type of computing system having an input device for receiving data, a processor for performing actions on the received data and/or stored data, a storage device for storing data, and an output device. System 102 may be implemented as a stand-alone tool or may be integrated as part of a larger system, e.g., a back end mortgage loan data processing system. Additionally, system 102 may be implemented using a plurality of computing systems in a distributed environment. For example, the functions described herein as being performed by system 102 may alternatively be performed, in whole or in part, by a client computing system 108, an independent system not coupled to network 114, a device coupled to network 114, etc.

System 102 includes a recourse and variance database system 106. Recourse and variance database system 106 stores and manages data associated with system 102. Database system 106 may be configured to store a record of variance and recourse transaction requests that have previously been processed by system 102. Database system 106 may also be configured to store additional information related to the processed requests such as the dispensation, information gathered during processing of the request, etc. Database system 106 may further store independently generated data such as a Fair, Isaac and Company (FICO) credit score, a risk profile, etc. The types of data and uses of the data in database system 106 are further discussed below with reference to FIGS. 2A-4.

Computing systems 108 are configured to enable access to transaction analysis system 102. Each computing system 108 includes an input device 110 such as a keyboard, a mouse, a data upload device (disk drive, network connection, etc.), or any other device configured receive input data. Input device 110 is configured to allow a user or a computing system to provide input data to computing system 108 for transmittal in a variance or recourse transaction request to system 102. Computing system 108 further includes an output device 112 such as a display monitor, a printer, a network connection, or any other device configured to provide output data to a user or computing system. Output device 112 is configured to display data received from system 102 based on the transmittal of a variance or recourse transaction request. Computing system 108 is connected to network 114 to enable communication with transaction analysis system 102.

Network 114 is a network configured to enable communication between transaction analysis system 102 and computing systems 108. According to an exemplary embodiment, network 114 is the Internet. According to yet another exemplary embodiment, network 114 can be a wireless network using for example, satellite, cellular, or RF networks to communicate. Network 114 can further be a wide area network (WAN) or a local area network (LAN). Network 114 may further be configured such that data can be transferred over network 114 using a secure web connection. Advantageously, a secure web connection will increase the security of transmitted financial information.

Network 114 may be further configured to enable communication with additional systems. Exemplary additional systems may include a system configured to provide a credit score (e.g. a FICO score), a current rates repository, a risk profiling system, etc., as will be discussed below with reference to FIG. 3.

Figure 2A:
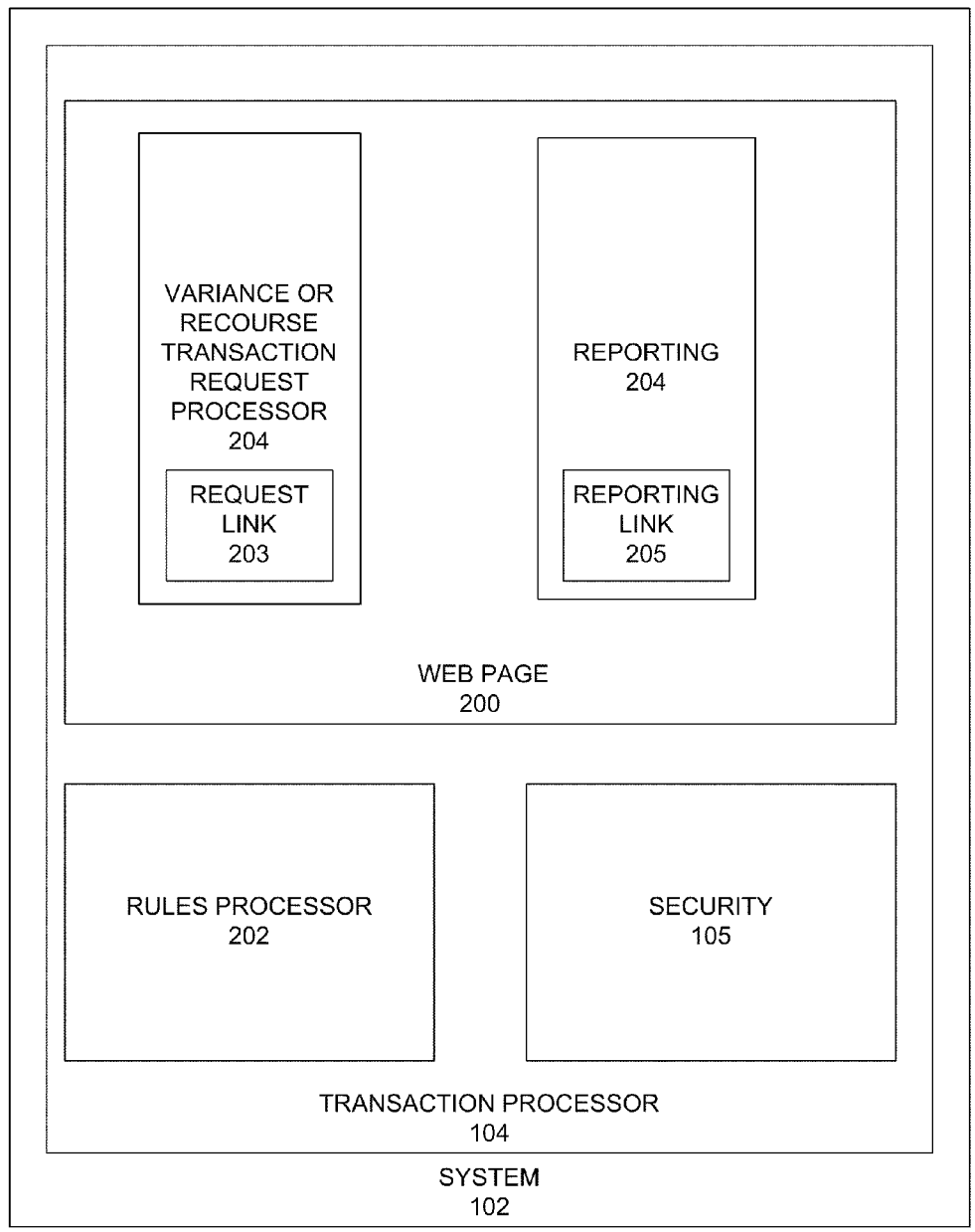
FIG. 2A is a block diagram of the transaction analysis system including a transaction request processing application configured to implement variance and recourse analysis functions, according to an exemplary embodiment.

Referring now to FIG. 2A, FIG. 2A is a block diagram of system 102 including a transaction request processing application 104 configured to implement variance and recourse analysis functions, according to an exemplary embodiment. Transaction request processing application 104 is a software application implemented on system 102. Alternatively, application 104 may be implemented on any one of or a plurality of computer systems 108.

Application 104 may include a security function 105 configured to provide secured access to information and functions offered through application 104. Secured access can include access secured by any of a variety of security measures such as a log-in function, a pass key function, encrypted data fields, encrypted data transmission, etc. Advantageously, secured access can help prevent unauthorized access to the financial information transmitted over network environment 100. Further, secured access may be used to verify the identity of the user and allows the user to gain access to system 102. Different types of users may be granted different levels and/or types of access to system 102 (e.g., for different employees within an organization having different levels of authority to approve transaction requests or having different job functions).

According to an exemplary embodiment, application 104 includes a rules processor 202, a variance or recourse transaction request processing function 204, and a reporting function 206. Application 104 may further include additional functions such as an administrative function, security function 105, described above, etc.

Rules processor 202 is a processor or application configured to receive input data, apply at least one rule to the input data, and provide an output. Rules processor 202 provides a mechanism for defining how different variances or recourse transaction should be handled. Further the rules processor can be used to automate a decision making process to the extent that given a specific set of inputs, a specific output should be produced. For example, for all variance transaction requests within a certain tolerance, the requests should be processed without human intervention as described below.

Rules processor 202 is configured to automate operation of application 104 to a greater or lesser degree. Automation can include automatic population of input fields based on other input fields, managing of the routing function described below with reference to FIG. 3, etc. The degree to which rules processor 202 automates the operation of application 104 may be configured by an individual user, dependent on the capabilities of system 102, or based on any other criteria. According to an exemplary embodiment, the rules applied by rules processor 202 may be stored in database system 106.

Application 104 is configured to utilize a web-based application to enable a web page 200 to provide access to variance and recourse transaction request analysis functions. Web page 200 may include a variance or recourse request links 203 and a reporting link 205. Although shown as selectable links, links 203 and 205 may alternatively be accessed through drop-down menus, or any other method. Further, links 203 and 205 may alternatively be implemented as a plurality of links. For example, a separate variance request link and recourse request link may be provided.

Web page 200 may include a single web page and/or a first web page and web pages linked to the first web page. For example, a first web page may include informational links, help links, links to other services, etc. as well as links 203 and 205.

Web page 200 may be implemented through application 104 on system 102 and accessed using a web browsing program on any one of computer systems 108. For example, a user seeking approval of a variance or recourse transaction may use a computing system 108 to access web page 200 and select any one of links 203 or 205.

Referring now to FIG. 2B, FIG. 2B is an illustration of a variance transaction request web page 220, according to an exemplary embodiment. Web page 220 may be utilized by application 104 to implement transaction request processing function 204 for variance transaction requests. Web page 220 may be accessed by clicking variance or recourse request links 203 on web page 200.

Variance or recourse web page 220 is a web page including information and a plurality of input fields to initiate a request for analysis of a variance or recourse transaction request. Web page 220 may further include information related to each input field to provide guidance and instruction for populating the input field. In operation, the user may use any one of computer systems 108 or system 102 to populate the input fields. After populating the input fields, the user can submit the input data to begin transaction request review process, further discussed below with reference to FIG. 3.

Web page 220 includes a request tracker ID field 221, a requestor ID field 222, a location ID field 223, a variance description field 224, a status field 225, a deal ID field 225, an answer due date section 226, a transaction reviewer section 227, and a submission button 228. Fields 221-228 may be implemented as text entry boxes, drop down menus, selection buttons, etc. Web page 220 may further include more, fewer, or different fields as necessary to facilitate analysis of the variance request. Also, fields 221-228 may further be combined or divided into separate fields.

Web page 220 may alternatively be implemented as separate web pages based on different content such as a transaction type, a region, a priority, etc. Each web page may include different input fields based on the content of the web page. The input fields may further be implemented as dynamic input fields. For example, upon selection of a variance transaction as a transaction type, the input fields include on web page 220 may be configured to receive appropriate information for a variance transaction request.

Variance or recourse information fields 221-225 may be used to receive information related to the variance or recourse transaction request being submitted for approval. Request tracker ID field 221 includes the identification number of the person seeking the information. This ID can be used to automatically be used to populate requestor ID field 222 to determine the identity of the person reviewing the request. This information and all other information related to the transaction request can be automatically store in database system 106 to facilitate tracking.

Location ID field 223 may be used to track regional difference and/or process transaction requests based on regional constraints. For example, a buyer may generally have stricter standards for granting variance transaction requests in one region compared to another based on, for example, local economy, local practices, etc.

Variance description field 224 is used to determine the type of variance requested. The variance description may be used in performing a routing function, described below with reference to FIG. 3. For example, a transaction reviewer, described below, may specialize in reviewing a specific type of variance transactions. Accordingly, when that type of variance transaction is selected in field 224, the transaction request should be routed to that transaction reviewer.

Status field 225 may be blank originally during submission, but updated periodically as the transaction request is processed by application 104. For example, when the transaction request is submitted, status field 225 may be changed to "PENDING" to reflect the new status of the request.

Answer due date section 226 may be used to indicate a preferred response date for the transaction request. Section 226 may be further configured to receive additional information such as the urgency level of the request, additional comments, etc.

Transaction reviewer section 227 may be used to receive a designation of a transaction reviewer. The transaction reviewer may be a person who typically reviews and/or approves the same type of transactions as the current type. Alternatively, the transaction reviewer may be rules processor 202, configured to approve and/or disapprove the transaction request without human intervention. According to an alternative embodiment, this field may also be automatically populated using rules processor 202 based upon the input data in fields 221-225.

Submission button 228 may be configured to receive a request for submission of the variance or recourse transaction request. Upon entry of the submit request, the date that the variance or recourse transaction request was first entered may also be entered. Advantageously, the submission date may be used to prioritize applications to prevent undue delay in the processing of requests. According to an exemplary embodiment, the submission date may be automatically supplied by application 104 based on the date the request is submitted.

The information may further include additional information that may be of interest to a transaction reviewer such as a submission time, a contact person, lender information, credit information, an expiration due date, and information related to the original agreement. According to an exemplary embodiment, variance or recourse information field 222 may include sufficient information regarding the variance or recourse transaction request to allow a transaction reviewer to decide whether to approve or reject the transaction request, further discussed below with reference to FIG. 3.

Referring now to FIG. 2C, FIG. 2C is an illustration of a recourse transaction request web page 230, according to an exemplary embodiment. Web page 230 may be utilized by application 104 to implement transaction request processing function 204 for recourse transaction requests. Web page 230 may be accessed through variance or recourse request link 203 on web page 200.

Web page 230 contains similar fields as described above with reference to FIG. 2B, such as a transaction ID field, a requester ID field, a location ID field, a transaction reviewer, a submission button, etc. These fields may be configured to receive similar information to that described above.

Web page 230 further includes a loan information section 232. Loan information field 232 may be configured to receive input data representative of the underlying loan for which the recourse is being sought. The information may include a borrower name, a borrower credit score, a property address, an assessed value, etc. Further, the recourse may be for a plurality of underlying loans, and loan information field 232 may include fields configured to receive an average unpaid principal balance 233, an average FICO score for the borrowers 234, and average loan to value ratio 235, etc. This information may be used in analyzing the recourse transaction request to determine the amount of risk involved in the transaction.

Referring now to FIG. 2D, FIG. 2D is an illustration of a reporting web page configured to facilitate tracking and analysis of transaction requests, according to an exemplary embodiment. Reporting web page 240 provides access to reporting function 206. Reporting web page 240 is accessed though reporting link 205.

Reporting function 206 is utilized in tracking and analysis of variance and/or recourse transaction requests that are currently pending or have been previously entered in system 102. Reporting function 206 may be accessed through web page 240 or during the process of analyzing a tracking a variance or recourse transaction request, described below with reference to FIG. 3. Accordingly, reporting function 206 may be utilized both in the process or approving a transaction request and in reviewing previous and/or current transaction request for informational purposes.

According to an exemplary embodiment, web page 240 includes input fields configured to receive search criteria and/or parameters used in generating a report for facilitating analysis using system 102. Web page 230 includes a location field 242, a submission dates field 244, and a status field 246. Web page 230 further includes a report display section 248 configured to display the generated report.

Location field 242 is an input field configured to receive a location or region for which the report is to be generated. For example, the regions may include a county region, a state region, a city region, etc. Generating reports based on a specific region allows a user to determine the standards for the particular region. The standards may be useful in determining whether to approve a transaction request from that region, comparing regions to determine compatibility, etc.

Submission date fields 244 is an input field configured to receive a date or range of dates for which a report is to be generated. For example, a user may wish to determine whether all transaction requests submitted on a certain date have been completed.

Status field 246 is an input field configured to receive a selection of the status for transactions requests to be displayed. For example, a user may wish to display all transaction quests that are currently pending. Further the search criteria may be combined such that a user can use location field 242 and status field 246 to obtain a report of all transaction request that are currently pending in Chicago for example.

Report display section 248 may be used to display the report generated using reporting function 206. Section 248 may include functions allowing a user to drill down through the data, sort based on various criteria, store or print the report, export the report to another program, etc.

Web page 230 may further include more, fewer, or different input fields configured to optimize the reporting function. For example, web page 230 may include a sorting criteria field that is used to configure how the generated report is sorted. For example, the generated report may have a location field, a date submitted field, a current status field, etc. Further, web page 230 may include a transaction reviewer field configured to receive the identity of a transaction reviewer for which a report is to be generated. For example, a transaction reviewer may wish to enter their own name to obtain a reporting listing all transaction requests that are currently pending or that have been previously handled. The report may further be used by the transaction reviewer to reviewing transactions to promote consistency and increase efficiency.

Figure 3:
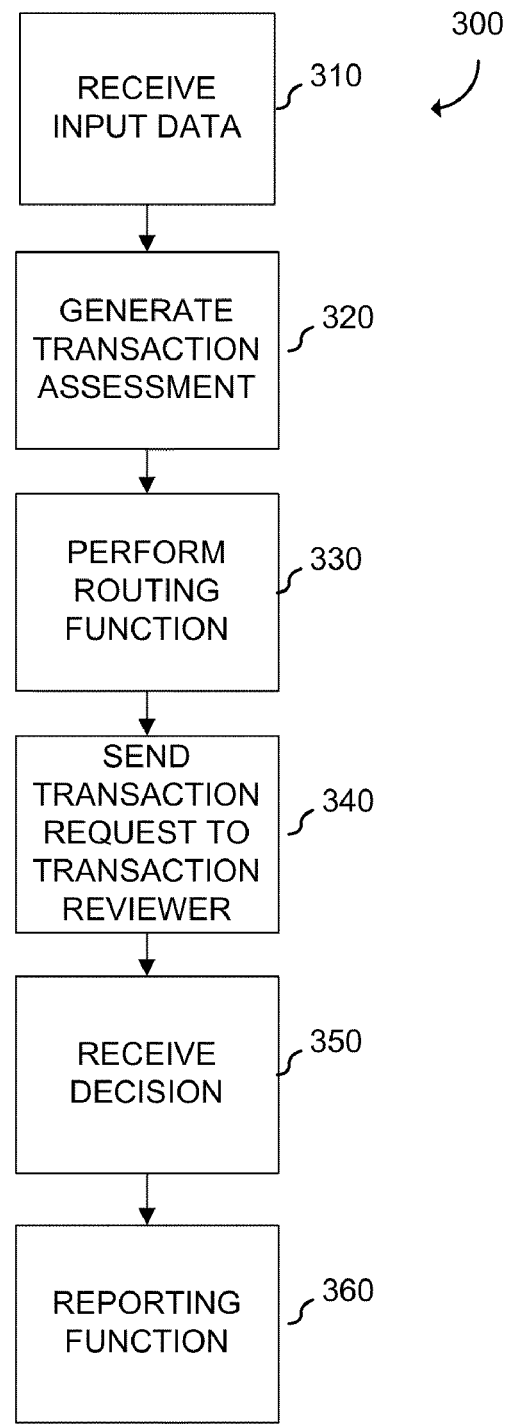
FIG. 3 is a flowchart illustrating a method for facilitating analysis of a variance or recourse transaction request is shown, according to an exemplary embodiment.

Referring now to FIG. 3, a flowchart 300 illustrating a method for facilitating analysis of a variance or recourse transaction request is shown, according to an exemplary embodiment. The method described may be utilized whenever a new transaction request is submitted.

In a step 310, input data is received by system 102. The data may be received based on population of the input field in web page 220, described above with reference to FIG. 2. According to an alternative embodiment, the data may be received based on a batch entry of received transaction requests, an automated procedure, from another system, etc.

Upon receipt of the input data in step 310, system 102 may be configured to gather additional data relevant to the transaction request and generate a transaction assessment in a step 320. The additional data may include any data that may be of interest to a transaction reviewer that will be approving the transaction request.

System 102 may be configured to gather additional data based on the input data to generate the transaction assessment. For example, where the transaction request is a recourse transaction request, system 102 may be configured to access a system for compiling, calculating, and reporting the over-all risk exposure of a corporation to determine the risk associated with the party seeking the recourse. Such a system is described in U.S. patent application Ser. No. 10/324,101, filed Dec. 20, 2002, and U.S. Provisional Application No. 60/342,366, filed Dec. 27, 2001, both incorporated herein by reference.

System 102 may further be configured to access database system 106 or other sources to obtain information related to the transaction request or the party initiating the transaction. System 102 may utilize the database information in creating the transaction assessment. For example, system 102 may compare the input data to an original agreement to determine a deviation from the original agreement.

Further, system 102 may be configured to utilize reporting function 206 to determine how transaction requests similar to the current transaction request have been handled. This information may be provided in the transaction assessment to facilitate analysis of the current transaction request. Advantageously, utilizing past transaction requests can increase consistency and efficiency in approving current transaction requests.

According to an exemplary embodiment, creation of the transaction assessment may be an interactive process. For example, when a transaction reviewer receives a transaction request as described below, the transaction reviewer may desire to customize the transaction assessment to include information particularly relevant to the transaction request and/or the transaction reviewer. Accordingly, a transaction reviewer may be questioned in step 304 to determine what information the transaction reviewer needs to analyze the transaction.

According to an alternative embodiment, the transaction request may be provided to a transaction reviewer without modification and step 320 may be bypassed. The transaction reviewer may receive the basic transaction request and a transaction assessment and either approve the request based on the input data or independent research.

Following generation of the transaction assessment, system 102 may be configured to perform a routing function to select a transaction reviewer to process the augmented transaction request in a step 330. The routing function may be based on at least some of the data in the augmented transaction request. The routing function may include a plurality of assessments to determine the transaction reviewer. For example, where the input data indicates that the transaction request is a variance transaction request, one criteria for selecting a transaction reviewer is that the transaction reviewer reviews variance transaction requests.

System 102 may further perform the routing function to determine whether the transaction request should be reviewed by a human transaction reviewer or using rules processor 202. For example, system 102 may be configured such that transaction requests that have criteria indicative of low risk transaction requests, such as a small loan amount, a credit rating within a prescribed range from an original agreement, etc., should be processed using rules processor 202, while higher risk transaction requests should be reviewed by a human transaction reviewer.

After routing, the augmented transaction request is provided to the transaction reviewer in a step 340. Providing augmented transaction request may include sending the augmented transaction request to the reviewer in an email, sending a link to a web page containing the augmented transaction request, using the augmented transaction request as an input for automated analysis, etc.

The transaction reviewer approves or rejects the transaction request in a step 350 based on the augmented transaction request. The approval or rejection may be communicated to the requestor in a step 360 to complete the process. According to an exemplary embodiment, the transaction assessment may be modified to include the approval or rejection and provided in step 360.

The above described method for facilitating the analysis of a transaction request may further include request tracking, implemented by the reporting function 206. Reporting function 206 may be configured to update a transaction request status at each stage of the method for facilitating the analysis of a transaction request. Further, upon completion of the method, reporting function 206 may be configured to add information related to the transaction request and its dispensation to database system 106.

Figure 4:
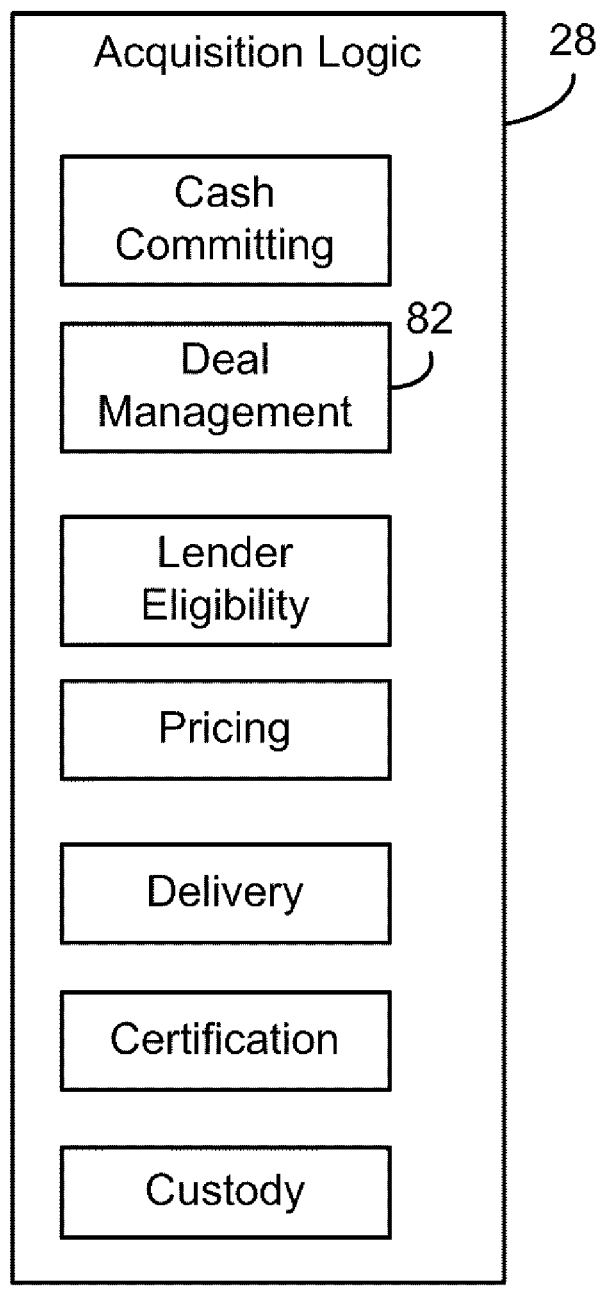
FIG. 4 is a block diagram of an acquisition system for managing acquisitions of loans, according to an exemplary embodiment.

Referring now to FIG. 4, FIG. 4 illustrates an acquisition system 28 for managing acquisitions of loans according to an exemplary embodiment. Acquisition system 28 is preferably usable to perform such operations as receiving information such as loan term, interest rate, principal owed and other parameters regarding loans when loans are first purchased or otherwise acquired. Acquisition system 28 may be an independent system or a component in a larger system configured for processing data pertaining to financial assets, such as loans and securities.

The acquisition system 28 includes a deal management system 82. Typically, a master agreement/contract may be in place between the purchaser and the lender which defines overall terms of loan sales to the purchaser pursuant to particular commitments. A cash commitment is an agreement (typically, governed by the overall master agreement) in which the mortgage purchaser agrees to buy mortgages from mortgage sellers (e.g., lenders) in exchange for a specified price in cash. Typically, a cash commitment agreement specifies the type of mortgage(s) the seller plans to deliver, the amount of time the seller has to make delivery, the price the mortgage purchaser will pay the seller for the loan(s), other pertinent loan terms, and, in some cases, loan level details pertaining to the mortgage.

The deal management system 82 is used to store and track terms of the deals/contracts made between sellers of loans and the purchaser. When a seller contacts the purchaser to initiate negotiation of a new deal, an authorized employee or other representative of the purchaser uses the deal management system 82 to create a master agreement, MBS pool contract and all the associated variances. Herein, the terms "deal," "contract," and "agreement" are used interchangeably. A variance may be necessary when a seller and purchaser agree that the seller may deliver loans that, for example, fall outside of the purchaser's standard terms for the purchase of loans or that represent a new product.

However, as stated above, a variance increases the risk to the purchaser. Accordingly, the variance transaction may need to be approved prior to submittal to deal management system 82. Accordingly, system 102 may be used to provide an input to deal management system 82 indicating whether a proposed variance transaction should be approved or rejected.

Acquisition system 28 may also include other systems in addition to the system described above. For example, acquisition system 28 may further include payable/receivable manager system to track the billing of price adjustments and fees. The payable/receivable manager system may also be used to display the status (including payment status) of such price adjustments and fees in a consolidated manner.

Many other changes and modifications may be made to the present invention without departing from the spirit thereof. For example, each of the features described above may also be implemented in systems or a system that are configured differently than system 102 and/or that include different, fewer or more functions than the functions included in system 102. The scope of these and other changes will become apparent from the appended claims.

What is claimed is:

1. A method for facilitating a recourse transaction, comprising:

receiving at a computer-implemented transaction analysis system loan input data and a recourse transaction request related to the loan input data, the loan input data and recourse transaction request being received from a client computing system, the loan input data and recourse transaction request being received after closing of a loan, the recourse transaction request being for the sale of the loan in a secondary mortgage market, the recourse transaction request being received from a seller of the loan by way of a communication network, the recourse transaction request being received for approval by a purchaser of the loan, the recourse transaction request being a request for a recourse transaction in which the purchaser has recourse against the seller in the event of a default of the loan, the loan input data being received using a web page, the web page having fields configured to be populated by the seller to receive the loan input data;

storing at a risk based transaction database a record of recourse transactions previously granted by the purchaser;

generating at the computer-implemented transaction analysis system an assessment of the recourse transaction based at least in part on the record of recourse transactions previously granted by the purchaser, wherein the assessment of the recourse transaction indicates one of an approval or disapproval of the recourse transaction; and providing, using the computer-implemented transaction analysis system, the assessment of the recourse transaction to the seller of the loan at the client computing system.

2. The method of claim 1, wherein generating the assessment of the recourse transaction includes determining a transaction reviewer.

3. The method of claim 1, further comprising generating a variance transaction report including variance transactions previously granted by the purchaser.

4. The method of claim 1, wherein generating the assessment of the recourse transaction further includes retrieving information from a transaction request database based on the loan input data and incorporating the retrieved information in the assessment of the recourse transaction.

5. The method of claim 4, wherein the loan input data further includes a transaction request originator and wherein generating the assessment of the recourse transaction includes generating the assessment of the recourse transaction based on the transaction request originator.

6. The method of claim 5, wherein providing the assessment of the recourse transaction based on the transaction request originator includes providing the assessment of the recourse transaction based on a FICO score of the transaction request originator.

7. The method of claim 5, wherein providing the assessment of the recourse transaction based on the transaction request originator includes providing the assessment of the recourse transaction based on a value of assets held by the transaction request originator.

8. The method of claim 4, wherein providing the assessment of the recourse transaction includes determining a transaction reviewer.

9. The method of claim 1, further comprising purchasing the loan from the seller in the secondary mortgage market after the loan has closed if the assessment of the recourse transaction indicates approval.

10. A system for facilitating a recourse transaction, comprising:

a processing unit; and a storage unit having instructions stored thereon, the instructions being executable by the processing unit to implement a method comprising:

receiving at a computer-implemented transaction analysis system loan input data and a recourse transaction request related to the loan input data, the loan input data and recourse transaction request being received from a client computing system, the loan input data and recourse transaction request being received after closing of a loan, the recourse transaction request being for the sale of the loan in a secondary mortgage market, the recourse transaction request being received from a seller of the loan by way of a communication network, the recourse transaction request being received for approval by a purchaser of the loan, the recourse transaction request being a request for a recourse transaction in which the purchaser has recourse against the seller in the event of a default of the loan, the loan input data being received using a web page, the web page having fields configured to be populated by the seller to receive the loan input data;

storing at a risk based transaction database a record of recourse transactions previously granted by the purchaser;

generating at the computer-implemented transaction analysis system an assessment of the recourse transaction based at least in part on the record of recourse transactions previously granted by the purchaser, wherein the assessment of the recourse transaction indicates one of an approval or disapproval of the recourse transaction; and providing, using the computer-implemented transaction analysis system, the assessment of the recourse transaction to the seller of the loan at the client computing system.

11. The system of claim 10, wherein generating the assessment of the recourse transaction includes determining a transaction reviewer.

12. The system of claim 10, wherein the method further comprises generating a variance transaction report including variance transactions previously granted by the purchaser.

13. The system of claim 10, wherein generating the assessment of the recourse transaction further includes retrieving information from a transaction request database based on the loan input data and incorporating the retrieved information in the assessment of the recourse transaction.

14. The system of claim 13, wherein the loan input data further includes a transaction request originator and wherein generating the assessment of the recourse transaction includes generating the assessment of the recourse transaction based on the transaction request originator.

15. The system of claim 14, wherein providing the assessment of the recourse transaction based on the transaction request originator includes providing the assessment of the recourse transaction based on a FICO score of the transaction request originator.

16. The system of claim 14, wherein providing the assessment of the recourse transaction based on the transaction request originator includes providing the assessment of the recourse transaction based on a value of assets held by the transaction request originator.

17. The system of claim 13, wherein providing the assessment of the recourse transaction includes determining a transaction reviewer.

18. A program product comprising instructions stored in a storage unit, the instructions being executable by a processing unit to implement a method of facilitating a recourse transaction, the method comprising:

receiving at a computer-implemented transaction analysis system loan input data and a recourse transaction request related to the loan input data, the loan input data and recourse transaction request being received from a client computing system, the loan input data and recourse transaction request being received after closing of a loan, the recourse transaction request being for the sale of the loan in a secondary mortgage market, the recourse transaction request being received from a seller of the loan by way of a communication network, the recourse transaction request being received for approval by a purchaser of the loan, the recourse transaction request being a request for a recourse transaction in which the purchaser has recourse against the seller in the event of a default of the loan, the loan input data being received using a web page, the web page having fields configured to be populated by the seller to receive the loan input data;

storing at a risk based transaction database a record of recourse transactions previously granted by the purchaser;

generating at the computer-implemented transaction analysis system an assessment of the recourse transaction based at least in part on the record of recourse transactions previously granted by the purchaser, wherein the assessment of the recourse transaction indicates one of an approval or disapproval of the recourse transaction; and providing, using the computer-implemented transaction analysis system, the assessment of the recourse transaction to the seller of the loan at the client computing system.

19. The program product of claim 18, wherein generating the assessment of the recourse transaction includes determining a transaction reviewer.

20. The program product of claim 18, wherein the method further comprises generating a variance transaction report including variance transactions previously granted by the purchaser.

* * * * *